J. W. BARNES.
BORING BAR FOR USE IN THE MANUFACTURE OF AMMUNITION SHELLS OR THE LIKE.
APPLICATION FILED APR. 17, 1916.
1,225,745.
Patented May 15, 1917.
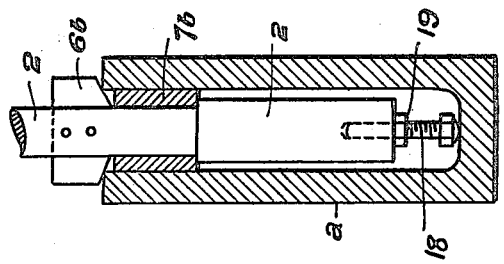
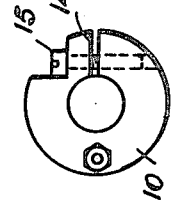
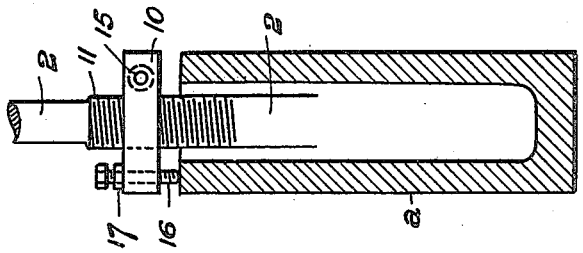
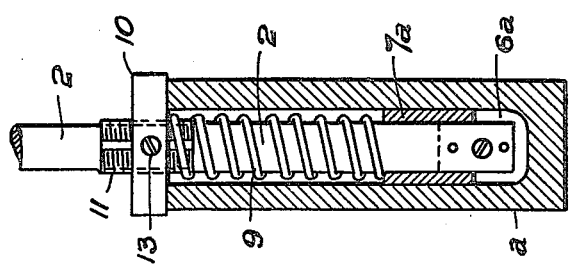
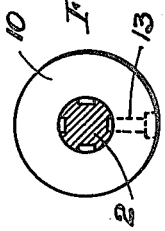
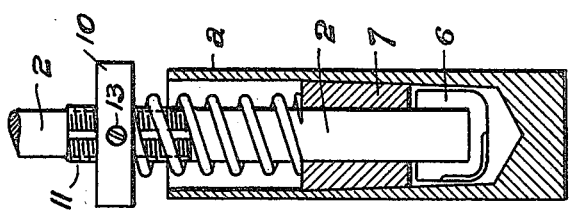
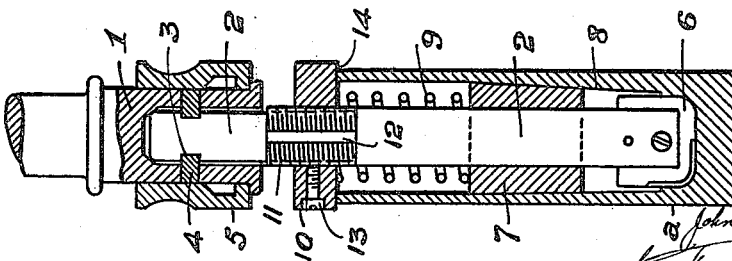
Inventor:
John William Barnes,
by Frank S. Ameman
Atty.

ized.

UNITED STATES PATENT OFFICE.

JOHN WILLIAM BARNES, OF ROCK FERRY, ENGLAND.

BORING-BAR FOR USE IN THE MANUFACTURE OF AMMUNITION-SHELLS OR THE LIKE.

1,225,745.  Specification of Letters Patent.  Patented May 15, 1917.

Application filed April 17, 1916. Serial No. 91,794.

*To all whom it may concern:*

Be it known that I, JOHN WILLIAM BARNES, of Railway Works, Rock Ferry, Cheshire, England, manufacturer, have invented certain new and useful Improvements in Boring-Bars for Use in the Manufacture of Ammunition-Shells or the like, of which the following is a specification.

The present invention relates to improved means for machining the interior of ammunition shells or the like and is particularly applicable to the machining of the usual lower pocket for the charge in shrapnel or other shell cases.

According to this invention, I employ a chuck, the socket of the chuck being screwed on to the tail-stock of a lathe or the spindle of a drilling machine, according to which of these machines the work is to be done in. A spindle is provided to fit the interior of the socket, the end of this spindle being capable of lateral flotation relatively to the socket bore, and having side recesses for engagement by driving pads in the socket which are caused to engage or disengage by a sliding sleeve. The end of the spindle is fitted with a cutting tool of the required shape and character desired for boring the shell, and on the shank of the spindle is slidably mounted a centralizing bearing piece for the spindle. Means are provided for limiting the depth of the cut, such as a disk adjustable on the spindle or a stud adjustable in the foot thereof.

The invention is illustrated in the accompanying drawings in which Figure 1. is a vertical section of a boring bar for shrapnel shells fitted with a bearing piece and adjustable disk. Fig. 2. is a view analogous to Fig. 1 showing the bearing piece just engaged and the cutter advancing to machine the lower pocket. Fig. 3. is a plan view of the adjustable disk, and Fig. 4. shows a cylindrical bearing piece on the cutter spindle suitable for use in machining parallel bore shells. Fig. 5. is a fragmentary section showing a modified arrangement of the adjustable disk for limiting the cut, and Fig. 6. is a plan of the disk shown in Fig. 5. Fig. 7. shows the application of the invention to chamfering the top of the shell the foot of the spindle being fitted with an adjustable stud for limiting the cut.

In carrying out the invention a chuck is provided comprising a socket 1 screwed to or otherwise carried from the tail stock of a lathe or the spindle of a drilling machine. A bar 2 is provided taking into the interior of the socket 1, the diameter of this bar being such that a slight amount of lateral flotation of the bar end may take place relatively to the socket bore, the bar having side recesses 3 for engagement by driving pads 4 radially movable in perforations in the socket wall and caused to engage with the recesses in the bar or disengage by the longitudinal movement of a sliding sleeve 5. In Figs. 1, 2, and 3, the invention is shown applied to the case of machining the lower pocket of shrapnel shells. In such an arrangement, the end of the bar 2 is fitted with a cutting tool 6 of the required shape, and on the shank of the bar is slidably and rotatably mounted a centralizing bearing piece 7. Where, as in the case shown, the tool is to be used for forming the base pocket of a shrapnel shell, this bearing piece is made conical on its exterior to conform to the conicality 8 of the bore of parts of the shell *a*. The bearing piece is resiliently engaged by a coiled spring 9 mounted around the bar 2 and between the bearing piece and a disk 10, so that the bearing piece, after it engages the conical part of the shell bore and is arrested against further longitudinal movement, as shown in Fig. 2. will permit the advance of the bar 2 to machine the pocket, the bar rotating freely in the block 7. The disk 10 is adjustable relatively to the cutter 6 by forming a thread 11 on the bar engaged by an internal thread on the disk. A number of grooves 12 is cut in the thread, and a small screw 13 fitted radially in the disk, the axial position of the disk being thus minutely adjusted, the screw 13 being engaged with any of the grooves 12 to fix the disk after it has been positioned. This disk block 10 is adapted to limit the depth of the cut by engaging the rim end 14 of the shell, and the bearing piece 7, as the tool 6 is entered in the shell, beds against the conical interior wall of the shell and forms an extended bearing or support close to the cutter accurately centralizing the cutting tool and holding it rigidly to its work, the cutter advancing relatively to the bearing. It is desirable to have several cutter bars, the pocket being formed in a number of successive operations. Where, as in Fig. 4, the interior of the shell is not conical, the bearing piece 7ᵃ for the bar 2 may be made of cylindrical or other shape as desired, the bearing piece in this arrangement maintaining its position close behind the advancing cutter 6ª and being resiliently held up to this position by the spring 9.

In place of positioning the adjustable disk by a screw and grooves 12 as described, the arrangement shown in Fig. 5, may be adopted, where the disk 10 is split at 14ª and after adjustment is adapted to be contracted on to the thread 11 of the bar 2 by a tangential screw 15. And instead of utilizing the disk itself to form the abutment against the rim of the shell to limit the depth of the cut, a screwed stud 16 may be threaded in the disk and fitted with a lock nut 17, the end of this screw 16 engaging the upper rim of the shell to limit the cut. By forming a very fine thread on the screw 16, the depth of the cut may be minutely controlled.

In order to chamfer the upper rim of the shell, as shown in Fig. 7, the bar 2 is again fitted with a bearing piece 7ᵇ cylindrical on its exterior and fitting the bore of the shell *a* the bearing piece being disposed close to the cutter 6ᵇ. In this arrangement it is desirable to limit the cut by a screw 18 threaded into the foot of the bar 2 and provided with a lock nut 19, the depth of the cut being limited by this stud 18 engaging the inner floor of the shell. By reason of the clearance allowed between the bar end 2 and the socket 1 of the chuck, a lateral floating of the bar relatively to the tail stock of the lathe or the drilling head of the drilling machine may be obtained during the operation of machining, and any want of alinement due to the spring of the tail stock or the drill arm neutralized.

I claim.

1. In a boring apparatus for shells or the like, in combination, a cutter bar, a bearing piece mounted revolubly and slidably on the bar, a disk adjustable longitudinally on the bar for limiting the depth of the cut, and a compression spring disposed between the disk and the bearing piece.

2. In a boring apparatus, in combination, a cutter bar, a disk mounted on the bar, a bearing piece mounted below the disk, and resilient means disposed between the bearing piece and disk for permitting longitudinal movement of the bar with relation to the bearing piece.

3. In a boring apparatus, in combination, a disk vertically adjustable on the cutter bar, a bearing block through which the cutter bar operates, adjustable means carried by the disk for limiting the movement of the cutter bar without adjusting the disk, and means for holding the disk and bearing block in spaced relation.

In testimony whereof I affix my signature in presence of two witnesses.

JOHN WILLIAM BARNES.

Witnesses:
A. J. DAVIES,
NELLIE HURST.

Copies of this patent may be obtained for five cents each, by addressing the "Commissioner of Patents, Washington, D. C."